US012735594B2

(12) United States Patent
Osborne et al.

(10) Patent No.: US 12,735,594 B2
(45) Date of Patent: Sep. 15, 2026

(54) PRINTING INK

(71) Applicant: Fujifilm Speciality Ink Systems Limited, Broadstairs (GB)

(72) Inventors: Gemma Osborne, Broadstairs (GB); Emma Porter, Broadstairs (GB); Seán Slater, Broadstairs (GB)

(73) Assignee: Fujifilm Speciality Ink Systems Limited, Broadstairs (GB)

( * ) Notice: Subject to any disclaimer, the term of this patent is extended or adjusted under 35 U.S.C. 154(b) by 246 days.

(21) Appl. No.: 18/285,838

(22) PCT Filed: Apr. 7, 2022

(86) PCT No.: PCT/GB2022/050869

§ 371 (c)(1), (2) Date: Oct. 5, 2023

(87) PCT Pub. No.: WO2022/214814

PCT Pub. Date: Oct. 13, 2022

(65) Prior Publication Data

US 2024/0368417 A1 Nov. 7, 2024

(30) Foreign Application Priority Data

Apr. 8, 2021 (GB) ..................................... 2105042

(51) Int. Cl.

*C09D 11/38* (2014.01)
*B41J 2/01* (2006.01)
*B41J 2/21* (2006.01)
*B41J 11/00* (2006.01)
*B41M 7/00* (2006.01)
*C09D 11/322* (2014.01)

(52) U.S. Cl.

CPC ................. *C09D 11/38* (2013.01); *B41J 2/01* (2013.01); *B41J 2/2107* (2013.01); *B41J 11/002* (2013.01); *B41J 11/0021* (2021.01); *B41J 11/00214* (2021.01); *B41M 7/0081* (2013.01); *C09D 11/322* (2013.01)

(58) Field of Classification Search

CPC ..... C09D 11/326; C09D 11/107; C09D 11/03; C09D 11/037; C09D 11/033; C09D 11/108; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41J 3/4078; B41J 11/0021; B41J 11/002; B41J 25/001; B41J 25/34; B41J 25/003; B41J 2/21; B41J 2/18; B41J 25/312; B41J 2025/008; B41J 2202/21; B41J 2/17596; B41J 2/16508; B41J 2/1652; B41J 2/16538; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 2/1623; B41J 2202/00; B41J 2202/03; B41J 2/14201; B41J 2/045; B41J 11/0015; B41J 2/04581; B41J 2/055; B41J 2002/16502; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41F 23/042; B41F 23/0436; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

2009/0317602 A1* 12/2009 Ward .................. C09D 11/101 522/173
2010/0330296 A1* 12/2010 Loccufier ............. C09D 11/101 522/26
2013/0052431 A1* 2/2013 Enomoto ............. C09D 133/16 522/39
2014/0050900 A1* 2/2014 Kodama ............... G03F 7/0755 264/447

(Continued)

FOREIGN PATENT DOCUMENTS

EP 2732460 B1 8/2017
EP 3885413 A1 9/2021
WO 2013/008940 A1 1/2013

OTHER PUBLICATIONS

International Search Report for corresponding PCT Application No. PCT/GB2022/050869 mailed Jun. 23, 2022.

(Continued)

*Primary Examiner* — Manish S Shah

(74) *Attorney, Agent, or Firm* — Wood, Phillips, Katz, Clark & Mortimer

(57) ABSTRACT

The present invention provides an inkjet ink comprising: a radiation-curable material; 4-hydroxy-2,2,6,6-tetramethylpiperidin-1-oxyl; and one or more photoinitiators selected from ethyl (2,4,6-trimethylbenzoyl) phenyl phosphinate, ethyl(3-benzoyl-2,4,6-trimethylbenzoyl)(phenyl) phosphinate, a polymeric phosphine oxide photoinitiator and mixtures thereof. The present invention also provides a method of inkjet printing using the inkjet ink.

14 Claims, No Drawings

(56) References Cited

U.S. PATENT DOCUMENTS

| | | | | |
|---|---|---|---|---|
| 2014/0121292 | A1* | 5/2014 | Kodama | C09D 4/00 522/18 |
| 2014/0154471 | A1* | 6/2014 | Kodama | C09D 133/04 264/293 |
| 2014/0370248 | A1* | 12/2014 | Hall | C09D 11/101 522/63 |
| 2016/0122563 | A1* | 5/2016 | Goto | B41J 2/01 347/102 |
| 2016/0251527 | A1* | 9/2016 | Okamoto | C09D 11/101 522/39 |
| 2022/0403198 | A1* | 12/2022 | Retailleau | C09D 11/322 |

OTHER PUBLICATIONS

Search Report for priority application No. GB2105042.2 mailed Sep. 29, 2021.

* cited by examiner

PRINTING INK

FIELD OF THE INVENTION

The present invention relates to a printing ink and in particular, to an inkjet ink with improved stray light resistance, even in the presence of water/solvent contamination.

BACKGROUND OF THE INVENTION

In inkjet printing, minute droplets of black, white or coloured ink are ejected in a controlled manner from one or more reservoirs or printing heads through narrow nozzles on to a substrate, which is moving relative to the reservoirs. The ejected ink forms an image on the substrate.

For high-speed printing, the inks must flow rapidly from the printing heads, and, to ensure that this happens, they must have in use a low viscosity, typically 200 mPas or less at 25° C., although in most applications the viscosity should be 50 mPas or less, and often 25 mPas or less. Typically, when ejected through the nozzles, the ink has a viscosity of less than 25 mPas, preferably 5-15 mPas and most preferably between 5-11 mPas at the jetting temperature, which is often elevated to, but not limited to 40-50° C. (the ink might have a much higher viscosity at ambient temperature).

The inks must also be resistant to drying or crusting in the reservoirs or nozzles. For these reasons, inkjet inks for application at or near ambient temperatures are commonly formulated to contain a large proportion of a mobile liquid vehicle or solvent such as water or a low-boiling solvent or mixture of solvents.

Another type of inkjet ink contains radiation-curable material, such as radiation-curable monomers and/or oligomers, which polymerise when cured. By "radiation-curable" is meant a material that polymerises and/or crosslinks upon irradiation, for example, when exposed to actinic radiation, in the presence of a photoinitiator. This type of ink has the advantage that it is not necessary to evaporate the liquid phase to dry the print; instead the print is cured, a process which is more rapid than evaporation of solvent at moderate temperatures.

Such radiation-curable inkjet inks can however suffer from unwanted polymerisation on exposure to stray light. Stray light may come from a nearby window and/or artificial ambient lighting. This can lead to various issues, including accelerated viscosity increase and/or jetting issues. In order to improve stray light resistance of an inkjet ink, stray light inhibitors, such as butylhydroxytoluene (BHT), can be included in the inkjet ink. Such stray light inhibitors reduce polymerisation of the ink on exposure to stray light and can typically delay the onset of polymerisation on exposure to stray light for a reasonable length of time.

As well as the issue of stray light resulting in unwanted polymerisation of the inkjet ink, inkjet inks can often be contaminated with low levels of solvent or water. This usually occurs when the inks are handled other than precisely in accordance with their operating instructions, or if there is sub-optimal environmental control of the inks. Water or solvent contamination adversely affects ink stability. This can reduce shelf-life, make inks more prone to an increase in viscosity when held at elevated temperature and can exacerbate the deterioration of stray light resistance. All of which negatively affects ink performance.

There is therefore a need in the art for an inkjet ink, which has improved stray light resistance, even in the presence of water/solvent contamination.

BRIEF SUMMARY OF THE INVENTION

Accordingly, the present invention provides an inkjet ink comprising: a radiation-curable material; 4-hydroxy-2,2,6,6-tetramethylpiperidin-1-oxyl; and one or more photoinitiators selected from ethyl (2,4,6-trimethylbenzoyl) phenyl phosphinate, ethyl(3-benzoyl-2,4,6-trimethylbenzoyl)(phenyl) phosphinate, a polymeric phosphine oxide photoinitiator and mixtures thereof.

The inventors have surprisingly found that the inclusion of 4-hydroxy-2,2,6,6-tetramethylpiperidin-1-oxyl in combination with one or more of the photoinitiators as claimed provides an inkjet ink having improved stray light resistance, even in the presence of water/solvent contamination.

The inkjet ink of the present invention comprises a radiation-curable material.

The radiation-curable material is not particularly limited and the formulator is free to include any such radiation-curable material in the ink of the present invention to improve the properties or performance of the ink. This radiation-curable material can include any radiation-curable material readily available and known in the art in inkjet inks. By "radiation-curable" is meant a material that polymerises and/or crosslinks upon irradiation, for example, when exposed to actinic radiation, in the presence of a photoinitiator.

The amount of radiation-curable material is not limited other than by the constraints imposed by the use in an inkjet ink, such as viscosity, stability, toxicity etc. In a preferred embodiment, the inkjet ink comprises 60.0 to 95.0% by weight of radiation-curable material, based on the total weight of the ink.

In a preferred embodiment, the inkjet ink comprises a radiation-curable monomer, preferably present in 60.0 to 95.0% by weight based on the total weight of the ink. As is known in the art, monomers may possess different degrees of functionality, which include mono, di, tri and higher functionality monomers.

For the avoidance of doubt, mono and difunctional are intended to have their standard meanings, i.e. one or two groups, respectively, which take part in the polymerisation reaction on curing. Multifunctional (which does not include difunctional) is intended to have its standard meaning, i.e. three or more groups, respectively, which take part in the polymerisation reaction on curing.

In a preferred embodiment, the radiation-curable material comprises a monofunctional monomer and/or difunctional monomer.

Preferably, the inkjet ink comprises a monofunctional monomer, such as a monofunctional (meth)acrylate monomer.

Monofunctional monomers are well known in the art. A radiation-curable monofunctional monomer has one functional group, which takes part in the polymerisation reaction on curing. The polymerisable group can be any group that is capable of polymerising upon exposure to radiation and is preferably selected from a (meth)acrylate group and a vinyl ether group.

The substituents of the monofunctional monomer are not limited other than by the constraints imposed by the use in an inkjet ink, such as viscosity, stability, toxicity etc. The substituents are typically alkyl, cycloalkyl, aryl and combinations thereof, any of which may be interrupted by heteroatoms. Non-limiting examples of substituents commonly used in the art include $C_{1-18}$ alkyl, $C_{3-18}$ cycloalkyl, $C_{5-10}$ aryl and combinations thereof, such as $C_{6-10}$ aryl- or $C_{3-18}$ cycloalkyl-substituted $C_{1-18}$ alkyl, any of which may be interrupted by 1-10 heteroatoms, such as oxygen or nitrogen, with nitrogen further substituted by any of the above described substituents. The substituents may together also form a cyclic structure.

The amount of monofunctional monomer is preferably 50.0 to 85.0% by weight, more preferably 60.0 to 80.0% by weight, based on the total weight of the ink.

In a preferred embodiment, the inkjet ink comprises a monofunctional (meth)acrylate monomer, which are well known in the art and are preferably the esters of acrylic acid. A detailed description is therefore not required. Mixtures of (meth)acrylates may also be used.

The substituents of the monofunctional (meth)acrylate monomer are not limited other than by the constraints imposed by the use in an inkjet ink, such as viscosity, stability, toxicity etc.

In a preferred embodiment, the inkjet ink comprises a monofunctional (meth)acrylate monomer present in 20.0 to 70.0% by weight, more preferably 30.0 to 60.0% by weight, based on the total weight of the ink.

The monofunctional (meth)acrylate monomer may be a cyclic monofunctional (meth)acrylate monomer and/or an acyclic-hydrocarbon monofunctional (meth)acrylate monomer.

The monofunctional (meth)acrylate monomer may comprise a cyclic monofunctional (meth)acrylate monomer.

The substituents of the cyclic monofunctional (meth) acrylate monomer are typically cycloalkyl, aryl and combinations thereof, any of which may be interrupted by heteroatoms and/or substituted by alkyl. Non-limiting examples of substituents commonly used in the art include $C_{3-18}$ cycloalkyl, $C_{6-10}$ aryl and combinations thereof, any of which may substituted with alkyl (such as $C_{1-18}$ alkyl) and/or any of which may be interrupted by 1-10 heteroatoms, such as oxygen or nitrogen, with nitrogen further substituted by any of the above described substituents. The substituents may together also form a cyclic structure.

The cyclic monofunctional (meth)acrylate monomer may be selected from isobornyl acrylate (IBOA), phenoxyethyl acrylate (PEA), cyclic TMP formal acrylate (CTFA), tetrahydrofurfuryl acrylate (THFA), (2-methyl-2-ethyl-1,3-dioxolane-4-yl)methyl acrylate (MEDA/Medol-10), isopropylidene glycerol acrylate (IPGA), 4-tert-butylcyclohexyl acrylate (TBCHA), 3,3,5-trimethylcyclohexyl acrylate (TMCHA), benzyl acrylate (BA) and mixtures thereof.

Preferably, the cyclic monofunctional (meth)acrylate monomer may be selected from cyclic TMP formal acrylate (CTFA), (2-methyl-2-ethyl-1,3-dioxolane-4-yl)methyl acrylate (MEDA/Medol-10), isopropylidene glycerol acrylate (IPGA) and mixtures thereof.

In a preferred embodiment, the radiation-curable material comprises (2-methyl-2-ethyl-1,3-dioxolane-4-yl)methyl acrylate (MEDA/Medol-10) and/or isopropylidene glycerol acrylate (IPGA).

Preferably, the inkjet ink comprises 5.0 to 50.0% by weight combined, preferably 5.0 to 40.0% by weight combined of (2-methyl-2-ethyl-1,3-dioxolane-4-yl)methyl acrylate (MEDA/Medol-10) and/or isopropylidene glycerol acrylate (IPGA), based on the total weight of the ink.

The inventors have found that the inclusion of (2-methyl-2-ethyl-1,3-dioxolane-4-yl)methyl acrylate (MEDA/Medol-10) and/or isopropylidene glycerol acrylate (IPGA) in the inkjet ink of the invention is particularly preferred as the inclusion of these monomers allows for improved film properties, in particular on LED curing. The photoinitiators used in the ink of the present invention (TPO-L, Speedcure XKm and/or a polymeric phosphine oxide photoinitiator) are less sensitive than other photoinitiators, particularly when using an LED cure source. This can result in reduced film properties, such as cure speed and surface tack. The inventors have found however that there is an improvement in cure speed and surface cure, as well as an improvement in low temperature flexibility, whilst maintaining reduced surface tack and adhesion, even when LED curing, on the inclusion of (2-methyl-2-ethyl-1,3-dioxolane-4-yl)methyl acrylate (MEDA/Medol-10) and/or isopropylidene glycerol acrylate (IPGA) in the inkjet ink of the invention.

In a preferred embodiment, the radiation-curable material comprises cyclic TMP formal acrylate (CTFA).

Preferably, the inkjet ink comprises 5.0 to 35.0% by weight of cyclic TMP formal acrylate (CTFA), based on the total weight of the ink.

The inventors have found that the inclusion of cyclic TMP formal acrylate in the inkjet ink of the invention is particularly preferred as it allows for improved film properties, in particular on LED curing. The photoinitiators used in the ink of the present invention (TPO-L, Speedcure XKm and/or a polymeric phosphine oxide photoinitiator) are less sensitive than other photoinitiators, particularly when using an LED cure source. This can result in reduced film properties, such as cure speed and surface tack. The inventors have found however that there is an improvement in cure speed and surface cure, as well as an improvement in low temperature flexibility and improved surface tack results, whilst maintaining adhesion, even when LED curing, on the inclusion of cyclic TMP formal acrylate in the inkjet ink of the invention.

The monofunctional (meth)acrylate monomer may comprise an acyclic-hydrocarbon monofunctional (meth)acrylate monomer.

The substituents of the acyclic-hydrocarbon monofunctional (meth)acrylate monomer are typically alkyl, which may be interrupted by heteroatoms. A non-limiting example of a substituent commonly used in the art is $C_{1-18}$ alkyl, which may be interrupted by 1-10 heteroatoms, such as oxygen or nitrogen, with nitrogen further substituted.

The acyclic-hydrocarbon monofunctional (meth)acrylate monomer may contain a linear or branched $C_6$-$C_{20}$ group. It may be selected from octadecyl acrylate (ODA), 2-(2-ethoxyethoxy)ethyl acrylate, tridecyl acrylate (TDA), isodecyl acrylate (IDA), lauryl acrylate and mixtures thereof. In a preferred embodiment, the acyclic-hydrocarbon monofunctional (meth)acrylate monomer contains a linear $C_6$-$C_{20}$ group.

For the avoidance of doubt, (meth)acrylate is intended herein to have its standard meaning, i.e. acrylate and/or methacrylate.

Monomers typically have a molecular weight of less than 750, preferably more than 200. Monomers are typically added to inkjet inks to reduce the viscosity of the inkjet ink. They therefore preferably have a viscosity of less than 150 mPas at 25° C., more preferably less than 100 mPas at 25° C. Monomer viscosities can be measured using an ARG2 rheometer manufactured by T.A. Instruments, which uses a 40 mm oblique/2° steel cone at 25° C. with a shear rate of 25 $s^{-1}$.

In a preferred embodiment, the inkjet ink comprises at least one N-vinyl amide monomer and/or N-(meth)acryloyl amine monomer.

N-Vinyl amide monomers are well-known monomers in the art. N-Vinyl amide monomers have a vinyl group attached to the nitrogen atom of an amide which may be further substituted in an analogous manner to the (meth) acrylate monomers. Preferred examples are N-vinyl caprolactam (NVC), N-vinyl pyrrolidone (NVP), N-vinyl piperidone, N-vinyl formamide and N-vinyl acetamide.

Similarly, N-acryloyl amine monomers are also well-known in the art. N-Acryloyl amine monomers also have a vinyl group attached to an amide but via the carbonyl carbon atom and again may be further substituted in an analogous manner to the (meth)acrylate monomers. A preferred example is N-acryloylmorpholine (ACMO).

N-Vinyl amide monomers are particularly preferred, and most preferably NVC.

In a preferred embodiment, the inkjet ink comprises NVC. Preferably the inkjet ink comprises 10.0 to 30.0% by weight of NVC, based on the total weight of the ink.

The inventors have found that the inclusion of NVC in the inkjet ink of the invention is particularly preferred as it allows for improved film properties, particularly on LED curing. The photoinitiators used in the ink of the present invention (TPO-L, Speedcure XKm and/or a polymeric phosphine oxide photoinitiator) are less sensitive than other photoinitiators, particularly when using an LED cure source. This can result in reduced film properties, such as cure speed and surface tack. The inventors have found however, on the inclusion of NVC in the inkjet ink of the invention, there is an improvement in cure speed and surface cure, as well as maintaining low temperature flexibility, surface tack results and adhesion, even when using an LED cure source.

The inkjet ink may also comprise one or more N-vinyl monomers other than an N-vinyl amide monomer and/or N-(meth)acryloyl amine monomer. Examples include N-vinyl carbazole, N-vinyl indole and N-vinyl imidazole.

In a preferred embodiment, the inkjet ink comprises a difunctional monomer.

Preferably, the inkjet ink comprises a monofunctional monomer and a difunctional monomer.

The functional group of the difunctional radiation-curable monomer, which is utilised in the ink of the present invention may be the same or different but must take part in the polymerisation reaction on curing. Examples of such functional groups include any groups that are capable of polymerising upon exposure to radiation and are preferably selected from a (meth)acrylate group and a vinyl ether group.

The substituents of the difunctional radiation-curable monomer are not limited other than by the constraints imposed by the use in an ink-jet ink, such as viscosity, stability, toxicity etc. The substituents are typically alkyl, cycloalkyl, aryl and combinations thereof, any of which may be interrupted by heteroatoms. Non-limiting examples of substituents commonly used in the art include $C_{1-18}$ alkyl, $C_{3-18}$ cycloalkyl, $C_{6-10}$ aryl and combinations thereof, such as $C_{6-10}$ aryl- or $C_{3-18}$ cycloalkyl-substituted $C_{1-18}$ alkyl, any of which may be interrupted by 1-10 heteroatoms, such as oxygen or nitrogen, with nitrogen further substituted by any of the above described substituents. The substituents may together also form a cyclic structure.

In a preferred embodiment, the inkjet ink comprises, 1.0 to 30.0% by weight, preferably 5.0 to 20.0% by weight of a difunctional radiation-curable monomer, based on the total weight of the ink.

Examples of the difunctional radiation-curable monomer include difunctional (meth)acrylate monomers, divinyl ether monomers, and difunctional vinyl ether (meth)acrylate monomers. Mixtures of difunctional radiation-curable monomers may be used.

In a preferred embodiment, the radiation-curable material comprises a difunctional (meth)acrylate monomer.

Difunctional (meth)acrylate monomers are well known in the art and a detailed description is therefore not required. Examples include hexanediol diacrylate (HDDA), 1,8-octanediol diacrylate, 1,9-nonanediol diacrylate, 1,10-decanediol diacrylate (DDDA), 1,11-undecanediol diacrylate and 1,12-dodecanediol diacrylate, polyethylene glycol diacrylate (for example tetraethylene glycol diacrylate, PEG200DA, PEG300DA, PEG400DA, PEG600DA), dipropylene glycol diacrylate (DPGDA), tripropylene glycol diacrylate (TPGDA), tricyclodecane dimethanol diacrylate (TCDDMDA), neopentylglycol diacrylate, 3-methyl-1,5-pentanediol diacrylate (3-MPDA), and the acrylate esters of ethoxylated or propoxylated glycols and polyols, for example, propoxylated neopentylglycol diacrylate (NPGPODA), and mixtures thereof. Also included are esters of methacrylic acid (i.e. methacrylates), such as hexanediol dimethacrylate, 1,8-octanediol dimethacrylate, 1,9-nonanediol dimethacrylate, 1,10-decanediol dimethacrylate, 1,11-undecanediol dimethacrylate and 1,12-dodecanediol dimethacrylate, triethyleneglycol dimethacrylate, diethyleneglycol dimethacrylate, ethyleneglycol dimethacrylate, 1,4-butanediol dimethacrylate and mixtures thereof.

Preferably, the inkjet ink comprises 1.0 to 30.0% by weight, preferably 5.0 to 20.0% by weight of a difunctional (meth)acrylate monomer, based on the total weight of the ink.

In a particularly preferred embodiment, the inkjet ink comprises polyethylene glycol (600) diacrylate. Preferably, the inkjet ink comprises polyethylene glycol (600) diacrylate in 1.0 to 30.0% by weight, preferably 5.0 to 20.0% by weight, based on the total weight of the ink.

The inventors have found that the inclusion of polyethylene glycol (600) diacrylate in the inkjet ink of the invention is particularly preferred as it allows for improved film properties, particularly for LED curing. The photoinitiators used in the ink of the present invention (TPO-L, Speedcure XKm and/or a polymeric phosphine oxide photoinitiator) are less sensitive than other photoinitiators, particularly when using an LED cure source. This can result in reduced film properties. The inventors have found however that there is an improvement in film properties, as well as a marked improvement in low temperature flexibility and adhesion on the inclusion of polyethylene glycol (600) diacrylate in the inkjet ink of the invention, even when LED curing.

In a particularly preferred embodiment, the radiation-curable material comprises one or more of a monofunctional (meth)acrylate monomer, a difunctional (meth)acrylate monomer and an N-vinyl amide monomer. Preferably, the inkjet ink comprises one or more monofunctional (meth) acrylate monomers, one or more difunctional (meth)acrylate monomers and one or more N-vinyl amide monomers.

Preferably, the radiation-curable material consists of one or more monofunctional (meth)acrylate monomers, one or more difunctional (meth)acrylate monomers and one or more N-vinyl amide monomers.

Preferably, the radiation-curable material comprises: N-vinyl caprolactam; polyethylene glycol (600) diacrylate; cyclic TMP formal acrylate; and (2-methyl-2-ethyl-1,3-dioxolane-4-yl)methyl acrylate and/or isopropylidene glycerol acrylate.

Preferably, the radiation-curable material consists of: N-vinyl caprolactam; polyethylene glycol (600) diacrylate; cyclic TMP formal acrylate; and (2-methyl-2-ethyl-1,3-dioxolane-4-yl)methyl acrylate and/or isopropylidene glycerol acrylate.

The inventors have found that this specific blend of radiation-curable material is particularly preferred to provide improved film properties for the inkjet ink of the present invention, particularly on LED curing. The photoinitiators used in the ink of the present invention (TPO-L, Speedcure XKm and/or a polymeric phosphine oxide photoinitiator) are less sensitive than other photoinitiators, particularly when using an LED cure source. This can result in reduced film properties, such as cure speed and surface tack. The inventors have found however that this blend increases cure speed and surface cure, even when the cure source is an LED cure source. This blend of radiation-curable material therefore optimises cure speed and surface cure of the inkjet ink on exposure to UV LED cure source. This blend of radiation-curable material also provides improved surface tack results, adhesion and low temperature flexibility.

In a preferred embodiment, the inkjet ink comprises a multifunctional radiation-curable monomer.

In a preferred embodiment, the multifunctional monomer is a tri-, tetra-, penta- or hexa-functional monomer, i.e. the radiation curable monomer has three, four, five or six functional groups.

The functional group of the multifunctional radiation-curable monomer, which is utilised in the ink of the present invention may be the same or different but must take part in the polymerisation reaction on curing. Examples of such functional groups include any groups that are capable of polymerising upon exposure to radiation and are preferably selected from a (meth)acrylate group and a vinyl ether group.

The multifunctional radiation-curable monomer may possess different degrees of functionality, and a mixture including combinations of tri and higher functionality monomers may be used.

The substituents of the multifunctional radiation-curable monomer are not limited other than by the constraints imposed by the use in an ink-jet ink, such as viscosity, stability, toxicity etc. The substituents are typically alkyl, cycloalkyl, aryl and combinations thereof, any of which may be interrupted by heteroatoms. Non-limiting examples of substituents commonly used in the art include $C_{1-18}$ alkyl, $C_{3-18}$ cycloalkyl, $C_{6-10}$ aryl and combinations thereof, such as $C_{6-10}$ aryl- or $C_{3-18}$ cycloalkyl-substituted $C_{1-18}$ alkyl, any of which may be interrupted by 1-10 heteroatoms, such as oxygen or nitrogen, with nitrogen further substituted by any of the above described substituents. The substituents may together also form a cyclic structure.

In a preferred embodiment, the inkjet ink comprises 0.1 to 20.0% by weight of a multifunctional radiation-curable monomer, based on the total weight of the ink.

Examples of multifunctional radiation-curable monomer include multifunctional (meth)acrylate monomers, multifunctional vinyl ether monomers and multifunctional vinyl ether (meth)acrylate monomers. Mixtures of multifunctional radiation-curable monomers may also be used.

The inkjet ink may comprise a multifunctional (meth) acrylate monomer.

Suitable multifunctional (meth)acrylate monomers (which do not include difunctional (meth)acrylate monomers) include tri-, tetra-, penta-, hexa-, hepta- and octa-functional monomers. Examples of the multifunctional acrylate monomers that may be included in the inkjet inks include trimethylolpropane triacrylate, dipentaerythritol triacrylate, tri(propylene glycol) triacrylate, bis(pentaerythritol) hexaacrylate, and the acrylate esters of ethoxylated or propoxylated glycols and polyols, for example, ethoxylated trimethylolpropane triacrylate and ethoxylated pentaerythritol tetraacrylate (EOPETTA, also known as PPTTA), and mixtures thereof. Suitable multifunctional (meth)acrylate monomers also include esters of methacrylic acid (i.e. methacrylates), such as trimethylolpropane trimethacrylate. Mixtures of (meth)acrylates may also be used.

The amount of the multifunctional (meth)acrylate monomer, when present, is preferably 0.1 to 20.0% by weight, based on the total weight of the ink.

The multifunctional radiation-curable monomer may have at least one vinyl ether functional group.

In a preferred embodiment, the inkjet ink comprises a multifunctional vinyl ether monomer and/or a multifunctional vinyl ether (meth)acrylate monomer.

An example of a multifunctional vinyl ether monomer is tris[4-(vinyloxy)butyl] trimellitate.

In a preferred embodiment, the multifunctional radiation-curable monomer is selected from trimethylolpropane triacrylate (TMPTA), di-trimethylolpropane tetraacrylate (DiTMPTA), di-pentaerythritol hexaacrylate (DPHA), ethoxylated trimethylolpropane triacrylate (EOTMPTA), ethoxylated pentaerythritol tetraacrylate (EOPETTA) and mixtures thereof.

The inkjet ink of the present invention may further comprise a radiation-curable (i.e. polymerisable) oligomer. Any radiation-curable oligomer that is compatible with the other ink components is suitable for use in the ink.

The term "curable oligomer" has its standard meaning in the art, namely that the component is partially reacted to form a pre-polymer having a plurality of repeating monomer units, which is capable of further polymerisation. The oligomer preferably has a molecular weight of at least 750.

The molecular weight is preferably 4,000 or less. Molecular weights (number average) can be calculated if the structure of the oligomer is known or molecular weights can be measured using gel permeation chromatography using polystyrene standards.

Oligomers are typically added to inkjet inks to increase the viscosity of the inkjet ink or to provide film-forming properties such as hardness or cure speed. They therefore preferably have a viscosity of 150 mPas or above at 25° C. Preferred oligomers for inclusion in the ink of the invention have a viscosity of 0.5 to 10 Pas at 50° C. Oligomer viscosities can be measured using an ARG2 rheometer manufactured by T.A. Instruments, which uses a 40 mm oblique/2° steel cone at 60° C. with a shear rate of 25 $s^{-1}$.

The amount of radiation-curable oligomer, when present, is preferably 0.1 to 10% by weight, based on the total weight of the ink.

The inkjet ink of the present invention comprises 4-hydroxy-2,2,6,6-tetramethylpiperidin-1-oxyl. It is a known nitroxyl stray light inhibitor for use in inkjet inks and is known commercially as OHT, 4-hydroxy-TEMPO or OH-TEMPO. It has the following structure:

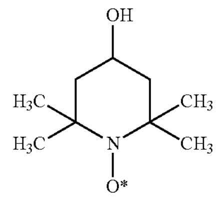

Although OHT is a known stray light inhibitor, the inventors have surprisingly found that the inclusion of OHT in combination with one or more photoinitiators selected from TPO-L, Speedcure XKm, a polymeric phosphine oxide photoinitiator and mixtures thereof, provides a marked improvement in stray light resistance. In particular, it has been found that the inkjet ink of the invention, which comprises OHT in combination with one or more photoinitiators selected from TPO-L, Speedcure XKm, a polymeric phosphine oxide photoinitiator and mixtures thereof, provides a marked improvement in stray light resistance when compared to the inclusion of OHT with a photoinitiator, other than TPO-L, Speedcure XKm, a polymeric phosphine oxide photoinitiator and mixtures thereof.

Further, the inventors have also surprisingly found that the inclusion of OHT in combination with one or more photoinitiators selected from TPO-L, Speedcure XKm, a polymeric phosphine oxide photoinitiator and mixtures thereof, provides a marked improvement in stray light resistance, even after low-level water/solvent contamination. In particular, it has been found that the inkjet ink of the invention, which comprises OHT in combination with one or more photoinitiators selected from TPO-L, Speedcure XKm, a polymeric phosphine oxide photoinitiator and mixtures thereof, provides a marked improvement in stray light resistance after low-level water/solvent contamination when compared to the inclusion of OHT with a photoinitiator, other than TPO-L, Speedcure XKm, a polymeric phosphine oxide photoinitiator and mixtures thereof.

Further, OHT can be included in the inkjet ink without detriment to cure when using an LED cure source, and without compromising film properties.

In a preferred embodiment, the ink comprises 0.01 to 2.5% by weight of 4-hydroxy-2,2,6,6-tetramethylpiperidin-1-oxyl, based on the total weight of the ink. Preferably, the inkjet ink comprises 0.1 to 1.5% by weight, more preferably 0.2 to 0.6% by weight of 4-hydroxy-2,2,6,6-tetramethylpiperidin-1-oxyl, based on the total weight of the ink.

In a preferred embodiment, 4-hydroxy-2,2,6,6-tetramethylpiperidin-1-oxyl is the sole stabiliser against deterioration by light present in the inkjet ink.

In a preferred embodiment, the inkjet ink contains less than 0.6% by weight, more preferably less than 0.1% by weight, more preferably less than 0.01% by weight of hydroquinone (HQ), methyletherhydroquinone (MEHQ), butylhydroxytoluene (BHT), aluminium N-oxido-N-phenylnitrous amide (NPAL or UV-12), zinc dibutyldithiocarbamate (butyl zimate or UV-2) and N,N-dimethyl carbamodithioic acid copper (II) salt (CDMC-O or UV-1).

The inkjet ink of the present invention comprises one or more photoinitiators selected from ethyl (2,4,6-trimethylbenzoyl) phenyl phosphinate, ethyl(3-benzoyl-2,4,6-trimethylbenzoyl)(phenyl) phosphinate, a polymeric phosphine oxide photoinitiator and mixtures thereof.

In a preferred embodiment, the inkjet ink comprises ethyl(2,4,6-trimethylbenzoyl) phenyl phosphinate. It is a phosphine oxide photoinitiator and is known commercially as TPO-L. It has the following structure:

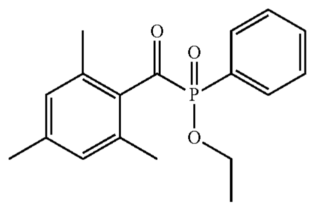 [SMILES: CCOP(=O)(C(=O)c1c(C)cc(C)cc1C)c1ccccc1]

Preferably, the inkjet ink comprises ethyl(2,4,6-trimethylbenzoyl) phenyl phosphinate in 1.0 to 20.0% by weight, more preferably 5.0 to 15.0% by weight, based on the total weight of the ink.

In a preferred embodiment, the inkjet ink comprises ethyl(3-benzoyl-2,4,6-trimethylbenzoyl)(phenyl) phosphinate. It is a phosphine oxide photoinitiator and is known commercially as Speedcure XKm. It has the following structure:

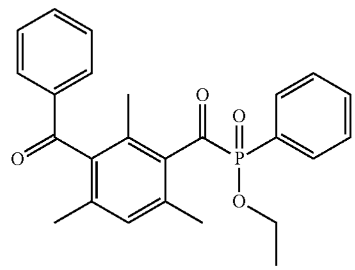 [SMILES: CCOP(=O)(C(=O)c1c(C)cc(C)c(C(=O)c2ccccc2)c1C)c1ccccc1]

Preferably, the inkjet ink comprises ethyl(3-benzoyl-2,4,6-trimethylbenzoyl)(phenyl) phosphinate in 1.0 to 20.0% by weight, more preferably 5.0 to 15.0% by weight, based on the total weight of the ink.

In a preferred embodiment, the inkjet ink comprises a polymeric phosphine oxide photoinitiator.

By a polymeric phosphine oxide photoinitiator is meant a photoinitiator comprising two or more phosphine oxide units connected by a phosphine oxide linking unit.

The phosphine oxide unit has the structure:

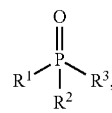

with the proviso that at least one of $R^1$, $R^2$ and $R^3$ is C═$OR^4$, and one of $R^1$, $R^2$, $R^3$ and $R^4$ is the phosphine oxide linking unit.

The polymeric phosphine oxide photoinitiator is therefore a polymeric acylphosphine oxide photoinitiator. The phosphine oxide unit can contain one, two or three C═$OR^4$ substituents. Preferably, the phosphine oxide unit contains one or two C═$OR^4$ substituents, more preferably one C═$OR^4$ substituent.

Otherwise, $R^1$, $R^2$, $R^3$ and $R^4$ are not limited other than by the constraints imposed by the use in an ink-jet ink, such as viscosity, stability, toxicity etc.

Preferably however, $R^1$, $R^2$ and $R^3$ are independently hydrogen, halogen, $C_{1-12}$ alkyl, $C_{2-12}$ alkenyl, $C_{2-12}$ alkynyl, $C_{7-12}$ aralkyl, $C_{7-12}$ alkaryl, $C_{6-12}$ aryl, $C_{5-12}$ heteroaryl, $C_{1-12}$ alkoxy, combinations thereof, C═$OR^4$ or the phosphine oxide linking unit, with the proviso that at least one of $R^1$, $R^2$ and $R^3$ is C═$OR^4$, and one of $R^1$, $R^2$, $R^3$ and $R^4$ is the phosphine oxide linking unit.

Preferably, $R^4$ is $C_{1-12}$ alkyl, $C_{2-12}$ alkenyl, $C_{2-12}$ alkynyl, $C_{7-12}$ aralkyl, $C_{7-12}$ alkaryl, $C_{6-12}$ aryl, $C_{5-12}$ heteroaryl, $C_{1-12}$ alkoxy, combinations thereof or the phosphine oxide linking unit. More preferably, $R^4$ is $C_{6-12}$ aryl.

More preferably, $R^1$ is C═$OR^4$, $R^2$ is $C_{6-12}$ aryl and $R^3$ is the phosphine oxide linking unit, wherein $R^4$ is $C_{6-12}$ aryl. Most preferably, $R^1$ is C═$OR^4$, $R^2$ is phenyl and $R^3$ is the phosphine oxide linking unit, wherein $R^4$ is 2,4,6-trimethylphenyl.

In a preferred embodiment, the polymeric phosphine oxide photoinitiator has two or more phosphine oxide units, more preferably three or more phosphine oxide units. Preferably, the polymeric phosphine oxide photoinitiator has up to six phosphine oxide units. Preferably, the polymeric phosphine oxide photoinitiator has two to six phosphine oxide units, more preferably two to four phosphine oxide units.

The two or more phosphine oxide units may be the same or different but preferably they are the same.

The phosphine oxide linking unit is a polymer. The polymer is not limited other than by the constraints imposed by the use in an ink-jet ink, such as viscosity, stability, toxicity etc.

Preferably, the phosphine oxide linking unit has a core based on a polyhydroxy compound. Non-limiting examples of a polyhydroxy compound include ethylene glycol, propylene glycol, butylene glycol, glycerol, trimethylolpropane, di-trimethylolpropane, pentaerythritol and di-pentaerythritol.

An optional repeating monomer unit may be present between the core based on a polyhydroxy compound and the two or more phosphine oxide units.

The repeating monomer unit is not limited other than by the constraints imposed by the use in an ink-jet ink, such as viscosity, stability, toxicity etc. Non-limiting examples include $(OCH_2CH_2)_n$, $(OCH(CH_3)CH_2)_n$, or $(OCH_2CH_2CH_2CH_2)_n$, wherein n is a value from 1 to 10. For example, the core may be based on glycerol bonded to repeating ethylene glycol monomer units via a condensation reaction between the hydroxy groups, which is then connected to the two or more phosphine oxide units by an oxygen of glycerol or an oxygen of the repeating ethylene glycol monomer units.

Preferably, the phosphine oxide linking unit is $(OCH_2CH_2)_nY$, $(OCH(CH_3)CH_2)_nY$, or $(OCH_2CH_2CH_2CH_2)_nY$, wherein n is a value from 0 to 10 and Y is O, $OCH_2CH(OZ)CH_2OZ$, $OCH_2C(CH_2OZ)(CH_2CH_3)CH_2OZ$, $OCH_2C(CH_2OZ)(CH_2CH_3)CH_2OCH_2C(CH_2OZ)(CH_2CH_3)CH_2OZ$, $OCH_2C(CH_2OZ)_2CH_2OZ$ or $OCH_2C(CH_2OZ)_2CH_2OCH_2C(CH_2OZ)_2OZ$, wherein Z is $(CH_2CH_2O)_n$, $(CH_2CH(CH_3)O)_n$ or $(CH_2CH_2CH_2CH_2O)_n$ and n is as defined above, and wherein the total value of n in the phosphine oxide linking unit is a value from 1 to 20.

In a preferred embodiment, the phosphine oxide linking unit is $(OCH_2CH_2)_nY$, wherein n is a value from 0 to 10 and Y is $OCH_2CH(OZ)CH_2OZ$, wherein Z is $(CH_2CH_2O)_n$ and n is as defined above, and wherein the total value of n in the phosphine oxide linking unit is a value from 1 to 20.

In a particularly preferred embodiment, $R^1$ is $C{=}OR^4$, $R^2$ is $C_{6-12}$ aryl and $R^3$ is the phosphine oxide linking unit, wherein $R^4$ is $C_{6-12}$ aryl and wherein the phosphine oxide linking unit is $(OCH_2CH_2)_nY$, wherein n is a value from 0 to 10 and Y is $OCH_2CH(OZ)CH_2OZ$, wherein Z is $(CH_2CH_2O)_n$ and n is as defined above, and wherein the total value of n in the phosphine oxide linking unit is a value from 1 to 20. More preferably, $R^1$ is $C{=}OR^4$, $R^2$ is phenyl and $R^3$ is the phosphine oxide linking unit, wherein $R^4$ is 2,4,6-trimethylphenyl and wherein the phosphine oxide linking unit is $(OCH_2CH_2)_nY$, wherein n is a value from 0 to 10 and Y is $OCH_2CH(OZ)CH_2OZ$, wherein Z is $(CH_2CH_2O)_n$ and n is as defined above, and wherein the total value of n in the phosphine oxide linking unit is a value from 1 to 20.

Preferably, the polymeric phosphine oxide photoinitiator has a molecular weight of more than 500 g/mol, more preferably more than 600 g/mol and most preferably more than 700 g/mol. Preferably, the polymeric phosphine oxide photoinitiator has a molecular weight of less than 2000 g/mol, more preferably less than 1800 g/mol and most preferably less than 1500 g/mol. In a preferred embodiment, the polymeric phosphine oxide photoinitiator has a molecular weight of more than 500 g/mol to less than 2000 g/mol, more preferably more than 600 g/mol to less than 2000 g/mol and most preferably more than 700 g/mol to less than 2000 g/mol. Molecular weights (number average) can be calculated if the structure of the photoinitiator is known or molecular weights can be measured using gel permeation chromatography using polystyrene standards.

The polymeric phosphine oxide photoinitiator may be used alone or two or more polymeric phosphine oxide photoinitiators may be used together. A preferred example of a polymeric phosphine oxide is Omnipol TP®.

Omnipol TP® is available from IGM. It is known by the chemical name polymeric ethyl(2,4,6-trimethylbenzoyl)-phenyl phosphinate or polymeric TPO-L. It has the following structure:

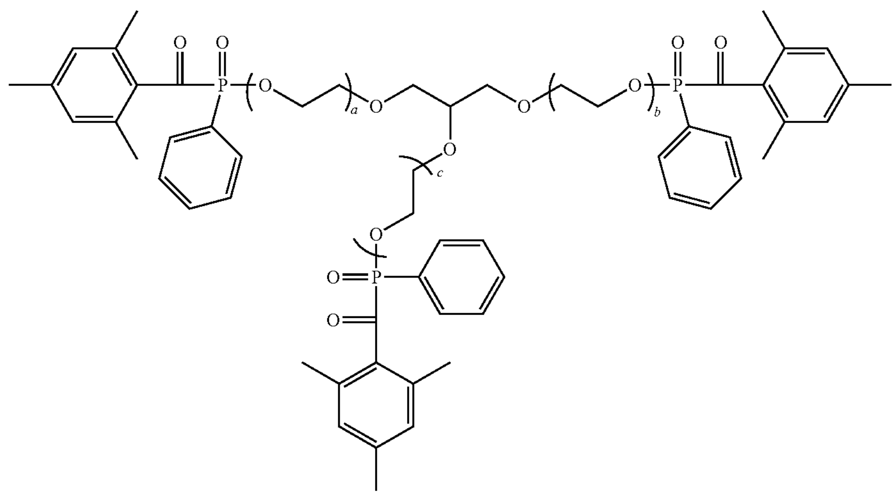

a + b + c = 1-20

The total value of a, b and c of the chemical formula for polymeric TPO-L is equal to 1-20.

In a preferred embodiment, the polymeric phosphine oxide photoinitiator comprises Omnipol TP® and more preferably, the polymeric phosphine oxide photoinitiator is Omnipol TP®.

Preferably, the inkjet ink comprises the polymeric phosphine oxide photoinitiator in 1.0 to 20.0% by weight, more preferably 5.0 to 15.0% by weight, based on the total weight of the ink. More preferably, the inkjet ink comprises Omnipol TP in 1.0 to 20.0% by weight, more preferably 5.0 to 15.0% by weight, based on the total weight of the ink.

As discussed above, the inventors have surprisingly found that the specific selection of TPO-L, Speedcure XKm and/or a polymeric phosphine oxide photoinitiator in combination with OHT provides an inkjet ink that has an unexpected improvement in stray light resistance, even in the presence of water/solvent contamination.

In a preferred embodiment, the inkjet ink comprises ethyl(2,4,6-trimethylbenzoyl) phenyl phosphinate and a polymeric phosphine oxide photoinitiator, preferably present in 1.0 to 20.0% by weight combined, more preferably 5.0 to 15.0% by weight combined, based on the total weight of the ink.

More preferably, the inkjet ink comprises ethyl(2,4,6-trimethylbenzoyl) phenyl phosphinate and

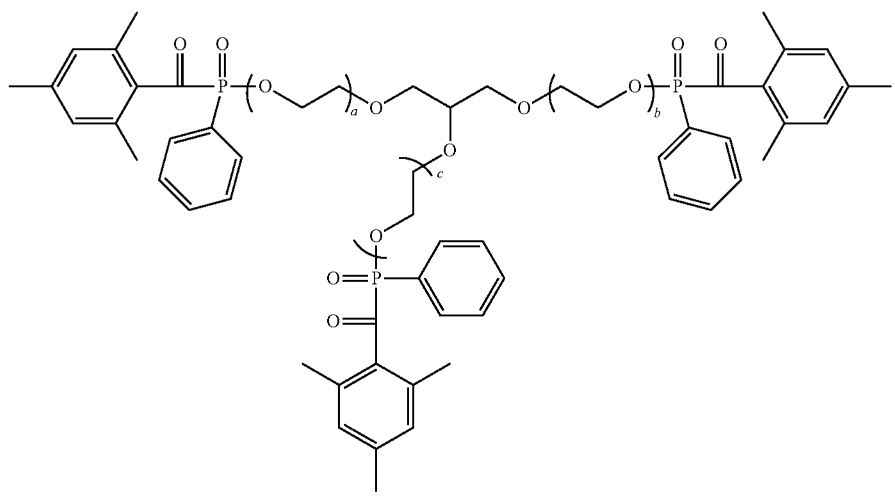

a + b + c = 1-20 preferably present in 1.0 to 20.0% by weight combined, more preferably 5.0 to 15.0% by weight combined, based on the total weight of the ink.

In a preferred embodiment, the inkjet ink comprises ethyl(2,4,6-trimethylbenzoyl) phenyl phosphinate and ethyl (3-benzoyl-2,4,6-trimethylbenzoyl)(phenyl) phosphinate, preferably present in 1.0 to 20.0% by weight combined, more preferably 5.0 to 15.0% by weight combined, based on the total weight of the ink.

In a preferred embodiment, the inkjet ink comprises ethyl(3-benzoyl-2,4,6-trimethylbenzoyl)(phenyl) phosphinate and a polymeric phosphine oxide photoinitiator, preferably present in 1.0 to 20.0% by weight combined, more preferably 5.0 to 15.0% by weight combined, based on the total weight of the ink.

More preferably, the inkjet ink comprises ethyl(3-benzoyl-2,4,6-trimethylbenzoyl)(phenyl) phosphinate and

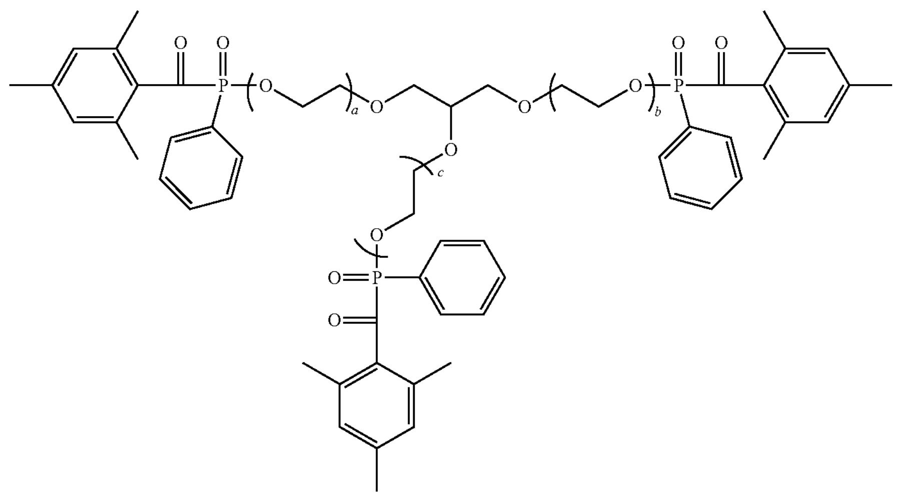

, a + b + c = 1-20 preferably present in 1.0 to 20.0% by weight combined, more preferably 5.0 to 15.0% by weight combined, based on the total weight of the ink.

In a preferred embodiment, the inkjet ink comprises ethyl(2,4,6-trimethylbenzoyl) phenyl phosphinate, ethyl(3-benzoyl-2,4,6-trimethylbenzoyl)(phenyl) phosphinate and a polymeric phosphine oxide photoinitiator, preferably present in 1.0 to 20.0% by weight combined, more preferably 5.0 to 15.0% by weight combined, based on the total weight of the ink.

More preferably, the inkjet ink comprises ethyl(2,4,6-trimethylbenzoyl) phenyl phosphinate, ethyl(3-benzoyl-2,4,6-trimethylbenzoyl)(phenyl) phosphinate and

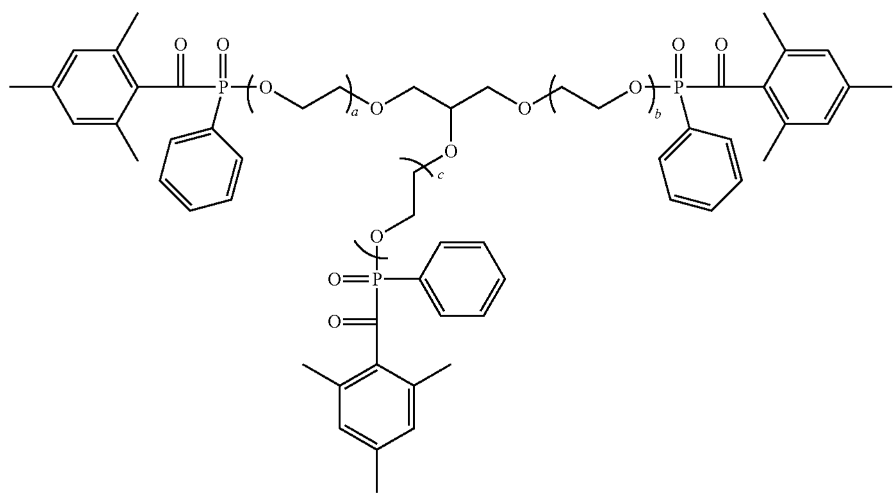

a + b + c = 1-20 preferably present in 1.0 to 20.0% by weight combined, more preferably 5.0 to 15.0% by weight combined, based on the total weight of the ink.

In a preferred embodiment, ethyl(2,4,6-trimethylbenzoyl) phenyl phosphinate, ethyl(3-benzoyl-2,4,6-trimethylbenzoyl)(phenyl) phosphinate and/or a polymeric phosphine oxide photoinitiator are the sole photoinitiators present in the inkjet ink.

More preferably, ethyl(2,4,6-trimethylbenzoyl) phenyl phosphinate, ethyl(3-benzoyl-2,4,6-trimethylbenzoyl)(phenyl) phosphinate and/or

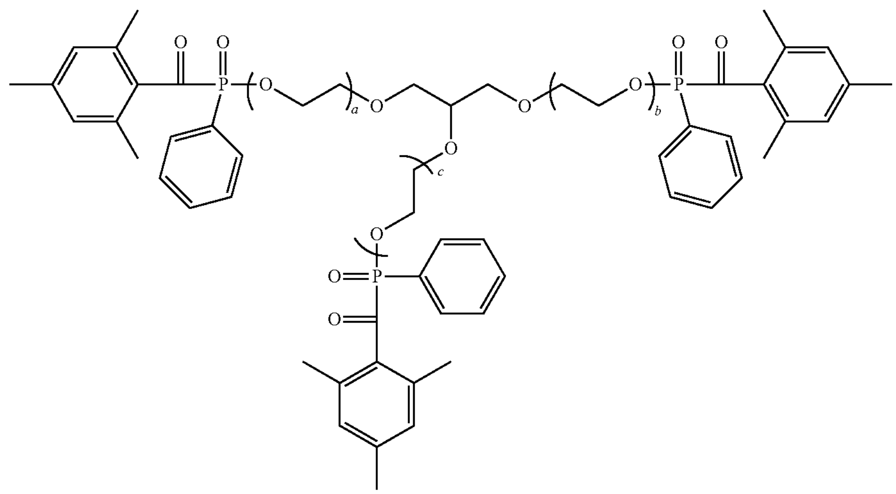

a + b + c = 1-20 are the sole photoinitiators present in the inkjet ink.

The inkjet ink may comprise one or more additional photoinitiators. By an additional photoinitiator is meant a photoinitiator other than TPO-L, Speedcure XKm and a polymeric phosphine oxide photoinitiator. The one or more additional photoinitiators are not particularly limited.

Preferred one or more additional photoinitiators are photoinitiators which produce free radicals on irradiation (free radical photoinitiators) such as, for example, isopropylthioxanthone (ITX), 1,3-di({α-[1-chloro-9-oxo-9H-thioxanthen-4-yl)oxy]acetylpoly[oxy(1-methylethylene)]} oxy)-2,2-bis({α-[1-chloro-9-oxo-9H-thioxanthen-4-yl)oxy]acetylpoly[oxy(1-methylethylene)]}oxymethyl) propane (Speedcure 7010), phenyl bis(2,4,6-trimethylbenzoyl)-phosphine oxide (BAPO), benzophenone, 1-hydroxycyclohexyl phenyl ketone, 2-benzyl-2-dimethylamino-(4-morpholinophenyl)butan-1-one, benzil dimethylketal, phenylbis(2,4,6-trimethylbenzoyl) phosphine oxide, diphenyl(2,4,6-trimethylbenzoyl)phosphine oxide (TPO), 1-[4-(2-hydroxyethoxyl)-phenyl]-2-hydroxy-2-methylpropanone (Omnirad 2959), 2-hydroxy-1-[4-[4-(2-hydroxy-2-methylpropanoyl)phenoxy]phenyl]-2-methylpropan-1-one (KIP160), or mixtures thereof. Such photoinitiators are known and commercially available such as, for example, under the trade names Omnirad (from IGM) and Esacure (from Lamberti).

In a preferred embodiment, the inkjet ink preferably contains less than 5% by weight, more preferably less than 2% by weight, more preferably less than 1% by weight, and more preferably is substantially free of any additional photoinitiators. The ink is therefore preferably substantially free of any photoinitiators, other than TPO-L, Speedcure XKm and a polymeric phosphine oxide photoinitiator. Put another way, in a preferred embodiment, TPO-L, Speedcure XKm and/or a polymeric phosphine oxide photoinitiator are the only photoinitiators present in the inkjet ink.

By substantially free is meant that only small amounts will be present, for example as impurities in the radiation-curable materials present. In other words, no additional photoinitiator is intentionally added to the ink. However, minor amounts of additional photoinitiator, which may be present as impurities in commercially available inkjet ink components, are tolerated. For example, the ink may comprise less than 0.5% by weight of additional photoinitiator, more preferably less than 0.1% by weight of additional photoinitiator, most preferably less than 0.05% by weight of additional photoinitiator, based on the total weight of the ink. In a preferred embodiment, the inkjet ink is free of additional photoinitiator.

In a preferred embodiment, the inkjet ink is substantially free of TPO. TPO is often used as a suitable photoinitiator for LED-curable inkjet inks. The present inventors have found that the claimed blend of photoinitiators, including TPO-L, Speedcure XKm and/or a polymeric phosphine oxide photoinitiator provide the required film properties on curing with an LED cure source, particularly when used in combination with an optimised blend of radiation-curable material. Further TPO-L, Speedcure XKm and a polymeric phosphine oxide photoinitiator are also less hazardous to health than TPO.

By substantially free is meant that only small amounts will be present, for example as impurities in the radiation-curable materials present. In other words, no TPO is intentionally added to the ink. However, minor amounts of TPO, which may be present as impurities in commercially available inkjet ink components, are tolerated. For example, the ink may comprise less than 0.5% by weight of TPO, more preferably less than 0.1% by weight of TPO, most preferably less than 0.05% by weight of TPO, based on the total weight of the ink. In a preferred embodiment, the inkjet ink is free of TPO.

The inkjet ink may contain one or more passive resins. Passive resins are resins which are not radiation-curable and hence do not undergo crosslinking under the curing conditions to which the ink is exposed. In other words, resin is not a radiation-curable material.

Any passive resin that is compatible with the ink components of the final inkjet ink is suitable for use in the inkjet ink of the present invention. Thus, the ink formulator is able to select from a wide range of suitable passive thermoplastic resins.

The resin may be selected from epoxy, polyester, vinyl, ketone, nitrocellulose, phenoxy or acrylate resins, or a mixture thereof and is preferably a poly(methyl(meth)acrylate) resin. Methacrylate copolymers are preferred.

The resin has a weight-average molecular weight of 20-200 KDa and preferably 20-60 KDa, as determined by GPC with polystyrene standards. The resin is preferably solid at 25° C. It is preferably soluble in the liquid medium of the ink (the radiation-curable diluent and, when present, additionally the solvent). The resin may improve adhesion of the ink to the substrate.

The resin, when present, is preferably present at 0.1 to 5% by weight, based on the total weight of the ink.

In a preferred embodiment, the inkjet ink of the present invention also includes a colouring agent, which may be either dissolved or dispersed in the liquid medium of the ink. The colouring agent can be any of a wide range of suitable colouring agents that would be known to the person skilled in the art.

Preferably, the colouring agent is a pigment, of the types known in the art and commercially available such as under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

In one aspect, the following pigments are preferred. Cyan: phthalocyanine pigments such as Phthalocyanine blue 15.4. Yellow: azo pigments such as Pigment yellow 120, Pigment yellow 151 and Pigment yellow 155. Magenta: quinacridone pigments, such as Pigment violet 19 or mixed crystal quinacridones such as Cromophtal Jet magenta 2BC and Cinquasia RT-355D. Black: carbon black pigments such as Pigment black 7.

Pigment particles dispersed in the ink should be sufficiently small to allow the ink to pass through an inkjet nozzle, typically having a particle size less than 8 μm, preferably less than 5 μm, more preferably less than 1 μm and particularly preferably less than 0.5 μm.

The colorant is preferably present in an amount of 0.2 to 20% by weight, preferably 0.3 to 15% by weight, based on the total weight of the ink. A higher concentration of pigment may be required for white inks, for example up to and including 30% by weight, or 25% by weight, based on the total weight of the ink.

The inkjet ink preferably dries primarily by curing, i.e. by the polymerisation of the monomers present, as discussed hereinabove, and hence is a curable ink. The ink does not, therefore, require the presence of water or a volatile organic solvent to effect drying of the ink. Preferably, the inkjet ink comprises less than 5% by weight of water and volatile organic solvent combined, preferably less than 3% by weight combined, more preferably, less than 2% by weight combined and more preferably less than 1% by weight combined, and most preferably, the inkjet ink is substantially free of water and volatile organic solvents, where the amounts are based on the total weight of the ink.

By substantially free is meant that only small amounts will be present, for example some water will typically be absorbed by the ink from the air and solvents may be present as impurities in the components of the inks, but such low levels are tolerated. In other words, no water or a volatile organic solvent is intentionally added to the ink. However, minor amounts of water or a volatile organic solvent, which may be present as impurities in commercially available inkjet ink components, are tolerated. For example, the ink may comprise less than 0.5% by weight of water or a volatile organic solvent, more preferably less than 0.1% by weight of water or a volatile organic solvent, most preferably less than 0.05% by weight of water or a volatile organic solvent, based on the total weight of the ink. In a preferred embodiment, the inkjet ink is free of water or a volatile organic solvent.

The inventors have surprisingly found that the inkjet ink of the invention has improved stability and stray light resistance, even in the presence of water/solvent contamination. This is beneficial for users of inkjet ink that have previously experienced issues with contamination owing to poor maintenance and/or uncontrolled environments.

In a preferred embodiment, the inkjet ink comprises a surfactant. The surfactant controls the surface tension of the ink. Surfactants are well known in the art and a detailed description is not required. Examples of suitable surfactants include Tego 2010 and BYK307. Adjustment of the surface tension of the inks allows control of the surface wetting of the inks on various substrates, for example, plastic substrates. Too high a surface tension can lead to ink pooling and/or a mottled appearance in high coverage areas of the print. Too low a surface tension can lead to excessive ink bleed between different coloured inks. Surface tension is also critical to ensuring stable jetting (nozzle plate wetting and sustainability). The surface tension is preferably in the range of 18-40 $mNm^{-1}$, more preferably 20-35 $mNm^{-1}$ and most preferably 20-30 $mNm^{-1}$.

Other components of types known in the art may be present in the ink of the present invention to improve the properties or performance. These components may be, for example, additional surfactants, defoamers, dispersants, synergists, stabilisers against deterioration by heat other than an aerobic stabiliser, reodorants, flow or slip aids, biocides and identifying tracers.

The amounts by weight provided herein are based on the total weight of the ink.

The ink or inkjet ink sets may be prepared by known methods such as stirring with a high-speed water-cooled stirrer, or milling on a horizontal bead-mill.

The ink exhibits a desirable low viscosity, less than 100 mPas, preferably 50 mPas or less, more preferably 30 mPas or less and most preferably 23 mPas or less at 25° C. The ink most preferably has a viscosity of 8 to 23 mPas at 25° C. Viscosity may be measured using a digital Brookfield viscometer fitted with a thermostatically controlled cup and spindle arrangement, such as model DV1.

The present invention also provides an inkjet ink set, wherein the inkjet ink set of the invention has at least one ink that falls within the scope of the inkjet ink according to the present invention. Preferably, all of the inks in the set fall within the scope of the inkjet ink according to the present invention.

Usually, the inkjet ink set of the present invention is in the form of a multi-chromatic inkjet ink set, which typically comprises a cyan ink, a magenta ink, a yellow ink and a black ink (a so-called trichromatic set). This set is often termed CMYK. The inks in a trichromatic set can be used to produce a wide range of colours and tones.

The present invention also provides a method of inkjet printing comprising inkjet printing the inkjet ink as defined herein onto a substrate and curing the inkjet ink by exposing the inkjet ink to a curing source.

In the method of inkjet printing of the present invention, the inkjet ink is inkjet printed onto a substrate. Printing is performed by inkjet printing, e.g. on a single-pass inkjet printer, for example for printing (directly) onto a substrate, on a roll-to-roll printer or a flat-bed printer. As discussed above, inkjet printing is well known in the art and a detailed description is not required.

The ink is jetted from one or more reservoirs or printing heads through narrow nozzles on to a substrate to form a printed image.

Print heads account for a significant portion of the cost of an entry level printer and it is therefore desirable to keep the number of print heads (and therefore the number of inks in the ink set) low. Reducing the number of print heads can reduce print quality and productivity. It is therefore desirable to balance the number of print heads in order to minimise cost without compromising print quality and productivity.

Substrates include those for packaging applications and in particular, flexible packaging applications. Examples include substrates composed of polyvinyl chloride (PVC), polystyrene, polyester, polyethylene terephthalate (PET), polyethylene terephthalate glycol modified (PETG) and polyolefin (e.g. polyethylene, polypropylene or mixtures or copolymers thereof). Further substrates include all cellulosic materials such as paper and board, or their mixtures/blends with the aforementioned synthetic materials.

When discussing the substrate, it is the surface which is most important, since it is the surface which is wetted by the ink. Thus, at least the surface of substrate is composed of the above-discussed material.

The present invention may also provide a printed substrate having the ink as defined herein printed thereon.

In order to produce a high quality printed image a small jetted drop size is desirable. Preferably the inkjet ink is jetted at drop sizes below 90 picolitres, preferably below 35 picolitres and most preferably below 10 picolitres.

To achieve compatibility with print heads that are capable of jetting drop sizes of 90 picolitres or less, a low viscosity ink is required. A viscosity of 30 mPas or less at 25° C. is preferred, for example, 8 to 12 mPas, 18 to 20 mPas, or 24 to 26 mPas. Ink viscosity may be measured using a Brookfield viscometer fitted with a thermostatically controlled cup and spindle arrangement, such as a DV1 low-viscosity viscometer running at 20 rpm at 25° C. with spindle 00.

The ink of the present invention is cured by any means known in the art, such as exposure to actinic radiation.

It should be noted that the terms "dry" and "cure" are often used interchangeably in the art when referring to radiation-curable inkjet inks to mean the conversion of the inkjet ink from a liquid to solid by polymerisation and/or crosslinking of the radiation-curable material. Herein, however, by "drying" is meant the removal of the water by evaporation and by "curing" is meant the polymerisation and/or crosslinking of the radiation-curable material. Further details of the printing, drying and curing process are provided in WO 2011/021052.

In a preferred embodiment, the ink is cured by exposing the printed ink to a source of actinic radiation.

The source of actinic radiation can be any source of actinic radiation that is suitable for curing radiation-curable inks but is preferably a UV source. Suitable UV sources are well known in the art and a detailed description is not required. These include mercury discharge lamps, fluorescent tubes, light emitting diodes (LEDs), flash lamps and combinations thereof Preferably, the source of actinic radiation is LEDs. There are many advantages of using LEDs as the UV source. In this regard, LEDs are cost effective, have long maintenance intervals, have high energy efficiency and are an environmentally friendly option. LEDs have a longer lifetime and exhibit no change in the power/wavelength output over time. LEDs also have the advantage of switching on instantaneously with no thermal stabilisation time and their use results in minimal heating of the substrate. However, it is particularly challenging to achieve good cure speed and surface cure when using an LED cure source. By cure speed is meant the speed at which the actinic radiation source moves relative to the substrate. The inventors have found that the inkjet ink provides good surface cure and cure speed, even when the source of actinic radiation is LEDs.

In a particularly preferred embodiment, the source of actinic radiation is LEDs. The inventors have surprisingly found that the ink of the present invention comprising OHT in combination with the claimed photoinitiators, and particularly comprising the preferred radiation-curable material discussed hereinabove, allows for good cure speed and surface cure, even when curing with a UV LED curing source.

LEDs are increasingly used to cure inkjet inks. UV light is emitted from a UV LED light source. UV LED light sources comprise one or more LEDs and are well known in the art. Thus, a detailed description is not required.

It will be understood that UV LED light sources emit radiation having a spread of wavelengths. The emission of UV LED light sources is identified by the wavelength which corresponds to the peak in the wavelength distribution. Compared to conventional mercury lamp UV sources, UV LED light sources emit UV radiation over a narrow range of wavelengths on the wavelength distribution. The width of the range of wavelengths on the wavelength distribution is called a wavelength band. LEDs therefore have a narrow wavelength output when compared to other sources of UV radiation. By a narrow wavelength band, it is meant that at least 90%, preferably at least 95%, of the radiation emitted from the UV LED light source has a wavelength within a wavelength band having a width of 50 nm or less, preferably, 30 nm or less, most preferably 15 nm or less.

In a preferred embodiment, at least 90%, preferably at least 95%, of the radiation emitted from the UV LED light source has a wavelength in a band having a width of 50 nm or less, preferably 30 nm or less, most preferably 15 nm or less.

The ink cures to form a relatively thin polymerised film. The ink of the present invention typically produces a printed film having a thickness of 1 to 20 μm, preferably 1 to 10 μm, for example 2 to 5 μm. Film thicknesses can be measured using a confocal laser scanning microscope.

DETAILED DESCRIPTION OF THE INVENTION

The invention will now be described with reference to the following examples, which are not intended to be limiting.

EXAMPLES

Example 1

Inkjet inks were prepared according to the formulations set out in Table 1. The inkjet ink formulations were prepared by mixing the components in the given amounts. Amounts are given as weight percentages based on the total weight of the ink.

TABLE 1

| Components | Ink 1 | Ink 2 | Ink 3 | Ink 4 | Ink 5 | Ink 6 | Ink 7 | Ink 8 |
|---|---|---|---|---|---|---|---|---|
| CTFA | 23.0 | 23.0 | 23.0 | 23.0 | 23.0 | 23.0 | 23.0 | 23.0 |
| PEA | 3.4 | 5.4 | 9.4 | 3.4 | 2.9 | 4.9 | 8.9 | 2.9 |
| NVC | 20.0 | 20.0 | 20.0 | 20.0 | 20.0 | 20.0 | 20.0 | 20.0 |
| Medol-10 | 16.0 | 16.0 | 16.0 | 16.0 | 16.0 | 16.0 | 16.0 | 16.0 |
| PEG600DA | 9.0 | 9.0 | 9.0 | 9.0 | 9.0 | 9.0 | 9.0 | 9.0 |
| BR113 in PEA | 5.0 | 5.0 | 5.0 | 5.0 | 5.0 | 5.0 | 5.0 | 5.0 |
| UV12 | 0.5 | 0.5 | 0.5 | 0.5 | 0.5 | 0.5 | 0.5 | 0.5 |
| ITX | 0.1 | 0.1 | 0.1 | 0.1 | 0.1 | 0.1 | 0.1 | 0.1 |
| Magenta dispersion | 12.0 | 12.0 | 12.0 | 12.0 | 12.0 | 12.0 | 12.0 | 12.0 |
| Tego 2010 | 1.0 | 1.0 | 1.0 | 1.0 | 1.0 | 1.0 | 1.0 | 1.0 |
| TPO-L | 10.0 | | | | 10.0 | | | |
| TPO | | 8.0 | | | | 8.0 | | |
| BAPO | | | 4.0 | | | | 4.0 | |
| Omnipol TP | | | | 10.0 | | | | 10.0 |
| OH Tempo | | | | | 0.5 | 0.5 | 0.5 | 0.5 |
| Total | 100.0 | 100.0 | 100.0 | 100.0 | 100.0 | 100.0 | 100.0 | 100.0 |
| Viscosity (mPas) | 23.07 | 24.24 | 21.36 | 30.35 | 23.31 | 24.69 | 21.51 | 30.7 |

CTFA, PEA and Medol-10 are monofunctional (meth) acrylate monomers. PEG600DA is a difunctional (meth) acrylate monomer. NVC is an N-vinyl amide monomer. BR113 in PEA is an acrylic resin solution in PEA (79% PEA, 20% Dianal BR113, 1% stabiliser, based on the total weight of the acrylic resin solution). UV12 is a stabiliser. Tego 2010 is a slip aid. ITX, TPO-L, TPO, BAPO and Omnipol TP are photo initiators. OH TEMPO is a stray light inhibitor.

Inks 1-4 are comparative examples as they have no OHT present. Ink 5 is an ink of the invention and has OHT present and TPO-L. Ink 6 is a comparative example. Ink 6 has OHT present but has TPO present as opposed to TPO-L, Speedcure XKm and/or a polymeric phosphine oxide photoinitiator. Ink 7 is a comparative example. Ink 7 has OHT present but has BAPO present as opposed to TPO-L, Speedcure XKm and/or a polymeric phosphine oxide photoinitiator. Ink 8 is an ink of the invention and has OHT present and Omnipol TP as the polymeric phosphine oxide photoinitiator.

The magenta pigment dispersion contains 30% pigment, 12% polymeric dispersing aid and 58% monomer. The dispersion was prepared by mixing the components in the given amounts and passing the mixture through a bead mill until the dispersion had a particle size of less than 0.3 microns. Amounts are given as weight percentages based on the total weight of the dispersion.

The viscosity of the ink was measured using a Brookfield viscometer running at 20 rpm at 25° C.

Stray Light Resistance

The inks of Table 1 were then assessed for stray light resistance.

The inks were placed into 6 ml glass vials. The inks were each placed in a light box using both a Store Light TL84 with a colour temperature of 4100K and an Artificial Daylight D65 with a colour temperature of 6500K.

The samples were then observed periodically and the degree of polymerisation assessed.

In order to assess the inks stray light resistance, the degree of polymerisation was assessed by tilting the vial to determine the presence of a polymerised layer of ink at the edge or surface. The time taken for the presence of this cured ink film was recorded and the results are provided in Table 2. The time taken for the ink to fully polymerise was also recorded and the results are also provided in Table 2.

TABLE 2

| Stray light resistance | | Ink 1 | Ink 2 | Ink 3 | Ink 4 | Ink 5 | Ink 6 | Ink 7 | Ink 8 |
|---|---|---|---|---|---|---|---|---|---|
| Time (hours) | Slight polymerisation detectable | 2 | 1.5 | 1 | 1 | 70 | 46 | 46 | >100 |
| Time (hours) | Solid polymerisation/ fully gelled | 24 | 22 | 22 | 24 | 100 | 95 | 53 | >100 |

This test was designed to observe the degree of polymerisation (or gelling) that may occur if the ink were to be exposed to stray light. Stray light is that which may come from a nearby window and/or artificial ambient lighting.

Inks 1-4, which do not contain OHT begin to polymerise rapidly, within 1-2 hours. The addition of OHT extends the time taken for all of these inks to polymerise, beyond 24 hours. This can be seen for Inks 5-8.

Inks 5 and 8 show significantly improved stray light resistance when compared to comparative inks 6 and 7. The inclusion of OHT in combination with TPO-L, Speedcure XKm and/or a polymeric phosphine oxide photoinitiator significantly extends stray light resistance beyond 48 hours when compared to OHT in combination with other photoinitiators. This can be seen when comparing Inks 5 and 8 to comparative inks 6 and 7. Inks 5 and 8 exhibited the best performance.

Stray Light Resistance after Water Contamination

Although it should be avoided where possible, inkjet inks can become contaminated with low levels of solvent or water (usually because of the mishandling or poor environmental control of the inks). Water or solvent contamination adversely affects ink stability. This can reduce shelf-life, make inks more prone to an increase in viscosity when held at elevated temperature and can exacerbate the deterioration of stray light resistance. All of which can negatively affect performance.

In order to replicate water contamination, the inks of Table 1 were contaminated with 1 and 2% water. The inks of Table 1 and the same inks contaminated with 1 and 2% water were then tested for stray light resistance using the same test as above. The results are provided in Tables 3 and 4.

TABLE 3

| Stray light resistance with water contamination | | Ink 1 | Ink + 1% $H_2O$ | Ink 1 + 2% $H_2O$ | Ink 2 | Ink 2 + 1% $H_2O$ | Ink 2 + 2% $H_2O$ | Ink 3 | Ink 3 + 1% $H_2O$ | Ink 3 + 2% $H_2O$ | Ink 4 | Ink 4 + 1% $H_2O$ | Ink 4 + 2% $H_2O$ |
|---|---|---|---|---|---|---|---|---|---|---|---|---|---|
| Time (h) | Slight polymerisation detectable | 2 | 2 | 0.5 | 1.5 | 1.5 | 0.5 | 1 | 1 | 0.25 | 1 | 1 | 0.5 |
| Time (h) | Solid polymerisation/ fully gelled | 24 | 28 | 22 | 22 | 22 | 22 | 22 | 22 | 22 | 24 | 24 | 22 |

TABLE 4

| Stray light resistance with water contamination | | Ink 5 | Ink 5 + 1% $H_2O$ | Ink 5 + 2% $H_2O$ | Ink 6 | Ink 6 + 1% $H_2O$ | Ink 6 + 2% $H_2O$ | Ink 7 | Ink 7 + 1% $H_2O$ | Ink 7 + 2% $H_2O$ | Ink 8 | Ink 8 + 1% $H_2O$ | Ink 8 + 2% $H_2O$ |
|---|---|---|---|---|---|---|---|---|---|---|---|---|---|
| Time (h) | Slight polymerisation detectable | 70 | 95 | 46 | 46 | 48 | 22 | 46 | 40 | 20 | >100 | >100 | 46 |
| Time (h) | Solid polymerisation/ fully gelled | 100 | >100 | 95 | 95 | 95 | 46 | 53 | 71 | 30 | >100 | >100 | 101 |

As can be seen from Tables 3 and 4, comparative inks 1-4 without OHT began to polymerise more rapidly with water contamination at 2% after just 15-30 minutes.

Comparative inks 6-7 with OHT but without TPO-L, Speedcure XKm and/or a polymeric phosphine oxide photoinitiator and 2% water contamination exhibited a reduction in stray light resistance compared to the control (0% water) to less than 24 hours.

Ink 5 and 8 of the invention still exhibited excellent stray light resistance with 2% water contamination at up to 48 hours.

Example 2

Inkjet inks were prepared according to the formulations set out in Table 5. The inkjet ink formulations were prepared by mixing the components in the given amounts. Amounts are given as weight percentages based on the total weight of the ink.

TABLE 5

| Components | Ink 9 | Ink 10 | Ink 11 | Ink 12 | Ink 13 | Ink 14 | Ink 15 | Ink 16 | Ink 17 |
|---|---|---|---|---|---|---|---|---|---|
| CTFA | 23.0 | 23.0 | 13.0 | 33.0 | 23.0 | 23.0 | 23.0 | 23.0 | 23.0 |
| PEA | 15.4 | 10.4 | 20.4 | 0.4 | 20.4 | 0.4 | 15.4 | 10.4 | 10.4 |
| NVC | 20.0 | 20.0 | 20.0 | 20.0 | 10.0 | 30.0 | 20.0 | 20.0 | 20.0 |
| Medol-10 | 9.0 | 9.0 | 9.0 | 9.0 | 9.0 | 9.0 | 9.0 | 9.0 | 9.0 |
| PEG600DA | 15.0 | 15.0 | 15.0 | 15.0 | 15.0 | 15.0 | 15.0 | | 7.5 |
| PEG400DA | | | | | | | | 15.0 | 7.5 |
| BR113 in PEA | 5.0 | 5.0 | 5.0 | 5.0 | 5.0 | 5.0 | | 5.0 | 5.0 |
| UV12 | 0.5 | 0.5 | 0.5 | 0.5 | 0.5 | 0.5 | 0.5 | 0.5 | 0.5 |
| OH Tempo | 0.5 | 0.5 | 0.5 | 0.5 | 0.5 | 0.5 | 0.5 | 0.5 | 0.5 |
| ITX | 0.1 | 0.1 | 0.1 | 0.1 | 0.1 | 0.1 | 0.1 | 0. | 0.1 |
| TPO-L | 5.0 | 10.0 | 10.0 | 10.0 | 10.0 | 10.0 | 10.0 | 10.0 | 10.0 |
| Cyan dispersion | 5.5 | 5.5 | 5.5 | 5.5 | 5.5 | 5.5 | 5.5 | 5.5 | 5.5 |
| Tego 2010 | 1.0 | 1.0 | 1.0 | 1.0 | 1.0 | 1.0 | 1.0 | 1.0 | 1.0 |
| Total | 100.0 | 100.0 | 100.0 | 100.0 | 100.0 | 100.0 | 100.0 | 100.0 | 100.0 |
| Viscosity (mPas) | 19.8 | 21.2 | 20.3 | 22.2 | 23.1 | 20.1 | 17.6 | 19.5 | 20.5 |

CTFA, PEA and Medol-10 are monofunctional (meth) acrylate monomers. PEG600DA and PEG400DA are difunctional (meth)acrylate monomers. NVC is an N-vinyl amide monomer. BR113 in PEA is an acrylic resin solution in PEA (79% PEA, 20% Dianal BR113, 1% stabiliser, based on the total weight of the acrylic resin solution). UV12 is a stabiliser. Tego 2010 is a slip aid. ITX and TPO-L are photoinitiators. OH TEMPO is a stray light inhibitor.

Inks 9-17 are inks of the invention. The amounts of components were varied for optimal film properties. Ink 10 is the most preferred ink of the invention as this ink has optimal film properties.

Inks 9 and 10 have a varied amount of TPO-L. Inks 10, 11 and 12 have a varied amount of CTFA. Inks 10, 13 and 14 have a varied amount of NyC. Ink 15 shows the effect of removal of BR113 in PEA from ink 10. Inks 16 and 17 have removed PEG600DA from ink 10 and replaced it with PEG400DA or a combination of PEG600DA/PEG400DA, respectively.

The cyan pigment dispersion contains 30% pigment, 10% polymeric dispersing aid and 60% monomer. The dispersion was prepared by mixing the components in the given amounts and passing the mixture through a bead mill until the dispersion had a particle size of less than 0.3 microns. Amounts are given as weight percentages based on the total weight of the dispersion.

The viscosity of the ink was measured using a Brookfield viscometer running at 20 rpm at 25° C.

Assessment of Surface Tackiness

In order to assess surface tackiness, the inkjet inks of Table 5 were drawn down in 2×24 μm films using a 24 μm wire wound K-bar onto a soft film PVC substrate and a PVC banner substrate. The ink films were then passed under a 20 W, 395 nm LED UV light (Phoseon Firepower FP300 150×20 mm) to provide a cured ink film.

At least 24 hours after curing, the surface cure (or tack) was determined and awarded a score out of 5. The tack was assessed by pressing a finger (wearing a nitrile glove) firmly onto the cured film and observing the degree of tackiness (adhesion to the glove). If the cured film stuck to the glove and could be lifted, a score of 1 was given. If there was no notable tack a score of 5 was awarded. Performance in between these extremes were awarded 2-4 in comparison with control ink 10. The results are provided in Table 6.

TABLE 6

| Tack test (>24 hours after curing) | | Ink 9 | Ink 10 | Ink 11 | Ink 12 | Ink 13 | Ink 14 | Ink 15 | Ink 16 | Ink 17 |
|---|---|---|---|---|---|---|---|---|---|---|
| 2 × 24 μm | Soft film PVC | 4 | 5 | 3 | 4 | 3 | 4 | 3 | 4 | 5 |
| | PVC banner | 5 | 5 | 4 | 4 | 3 | 4 | 4 | 5 | 5 |

Achieving a tack free finish after LED-curing is challenging. It is advantageous for the tack of a print to minimal so that prints do not stick to one another, often referred to as 'blocking'.

All of the inks achieved acceptable surface tack results. The preferred formulations for tack were inks 10, 16 and 17.

There is a slight improvement of surface tack on optimisation of the amount of TPO-L as can be seen from inks 9 and 10. There is also improvement of surface tack on optimisation of the amount of CTFA as can be seen from inks 10, 11 and 12. This is also the case for the amount of NVC, where there is an improvement of surface tack results on optimisation of the amount of NVC, see inks 10, 13 and 14.

Ink 15 shows the effect of removing BR113 from ink 10. The removal of BR113 does not significantly impact the results and is an optional component of the inkjet ink.

Low Temperature Flexibility

In order to assess low temperature flexibility, the inkjet inks of Table 5 were drawn down in 2×24 μm films using a 24 μm wire wound K-bar onto a soft film PVC substrate and a PVC banner substrate. The ink films were then passed under a 20 W, 395 nm LED UV light (Phoseon Firepower FP300 150×20 mm) to provide a cured ink film.

Low temperature flexibility was assessed by storing the prints in a freezer (set to −15° C.) for 48 hours. The draw-downs were then folded to a 1800 angle with the cured film on the outer surface. The film & material was assessed on a 1-5 scale. 5 was awarded for excellent performance with no visible cracking, and a score of 1 for severe cracking. Performance in between these extremes were awarded 2-4 in comparison with control ink 10. The results are provided in Table 7.

TABLE 7

| Low Temperature Flexibility (−15° C.) | | Ink 9 | Ink 10 | Ink 11 | Ink 12 | Ink 13 | Ink 14 | Ink 15 | Ink 16 | Ink 17 |
|---|---|---|---|---|---|---|---|---|---|---|
| 2 × 24 μm | Soft film PVC | 5 | 5 | 5 | 5 | 5 | 5 | 5 | 3 | 4 |
| | PVC Banner | 5 | 5 | 5 | 5 | 5 | 5 | 5 | 3 | 5 |

Inks 9-17 have excellent low temperature flexibility with no visible cracking.

The inclusion of PEG600DA is preferred for excellent low temperature flexibility. This can be seen when comparing inks 9-15, which contain PEG600DA at 15% by weight, based on the total weight of the ink, to inks 16 and 17. Ink 16 contains PEG400DA and Ink 17 contains a combination of PEG400DA and PEG600DA. In this regard, inks 9-15 score 5 for low temperature flexibility. Replacement of PEG600DA with PEG400DA as in ink 16 showed a reduction in low temperature flexibility indicated by small cracks on both the soft film PVC substrate and PVC banner substrate. This is also the case for ink 17.

Adhesion Assessment

In order to assess adhesion, the inkjet inks of Table 5 were drawn down in 12 μm films using a 12 μm wire wound K-bar onto a Correx 4 mm (polypropylene) substrate, a Priplack Matt (polypropylene) substrate and an acrylic substrate. The ink films were then passed under a 20 W, 395 nm LED UV light (Phoseon Firepower FP300 150×20 mm) to provide a cured ink film.

The adhesion was assessed by subjecting the prints to a cross hatch test, during which the film is cut using an Elcometer cross hatch testing kit. A piece of tape (3M scotch) was then firmly applied over the cut area and removed. The degree of film removed with the tape was then quantified as a percentage. 0% removal is excellent, 100% removal is poor. The results are provided in Table 8.

TABLE 8

| Adhesion (% removal) 0 hours | | Ink 9 | Ink 10 | Ink 11 | Ink 12 | Ink 13 | Ink 14 | Ink 15 | Ink 16 | Ink 17 |
|---|---|---|---|---|---|---|---|---|---|---|
| 12 μm | Correx 4 mm | 5 | 0 | 5 | 1 | 4 | 3 | 8 | 6 | 1 |
| | Priplack Matt | 0 | 1 | 0 | 0 | 0 | 0 | 0 | 2 | 16 |
| | Acrylic | 0 | 0 | 0 | 0 | 0 | 0 | 0 | 83 | 33 |

Inks 10 and 12 exhibited the best adhesion performance. Inks 9-15 had excellent adhesion performance.

The inclusion of PEG600DA is preferred for excellent adhesion. This can be seen when comparing inks 9-15, which contain PEG600DA at 15% by weight, based on the total weight of the ink, to inks 16 and 17. Ink 16 contains PEG400DA and Ink 17 contains a combination of PEG400DA and PEG600DA. Replacement of PEG600DA with PEG400DA as in ink 16 showed a reduction of adhesion to all substrates. This is also the case for ink 17.

Reference Example 3

Inkjet inks were prepared according to the formulations set out in Table 9. The inkjet ink formulations were prepared by mixing the components in the given amounts. Amounts are given as weight percentages based on the total weight of the ink.

TABLE 9

| Components | Ink 18 | Ink 19 | Ink 20 | Ink 21 | Ink 22 | Ink 23 | Ink 24 | Ink 25 | Ink 26 | Ink 27 | Ink 28 |
|---|---|---|---|---|---|---|---|---|---|---|---|
| PEA | 29.9 | 24.9 | 19.9 | 27.9 | 23.9 | 19.9 | 19.9 | 38.9 | 29.9 | 38.9 | 29.9 |
| NVC | 20 | 20 | 20 | 20 | 20 | 20 | 20 | 20 | 20 | 20 | 20 |
| Medol-10 | 18 | 18 | 18 | 18 | 18 | 18 | 18 | 9 | 9 | | 9 |
| PEG600DA | 15 | 15 | 15 | 15 | 15 | 15 | 15 | 15 | 15 | 15 | 15 |
| UV12 | 0.5 | 0.5 | 0.5 | 0.5 | 0.5 | 0.5 | 0.5 | 0.5 | 0.5 | 0.5 | 0.5 |
| ITX | 0.1 | 0.1 | 0.1 | 0.1 | 0.1 | 0.1 | 0.1 | 0.1 | 0.1 | 0.1 | 0.1 |
| TPO-L | 10 | 15 | 20 | 10 | 10 | 10 | 10 | 10 | 10 | 10 | 10 |
| Cyan dispersion | 5.5 | 5.5 | 5.5 | 5.5 | 5.5 | 5.5 | 5.5 | 5.5 | 5.5 | 5.5 | 5.5 |
| Tego 2010 | 1 | 1 | 1 | 1 | 1 | 1 | 1 | 1 | 1 | 1 | 1 |
| CTFA | | | | | | | | | 9 | | |
| TPO | | | | 2 | 4 | | | | | | |
| BR113 in PEA | | | | | | 10 | | | | 9 | 9 |
| DM55 in PEA (20%) | | | | | | | 10 | | | | |
| Total | 100 | 100 | 100 | 100 | 98 | 100 | 100 | 100 | 100 | 100 | 100 |
| Viscosity (mPas) | 16.1 | 18 | 19.8 | 17.2 | 18.7 | 23.1 | 18.9 | 17.2 | 17.6 | 25.7 | 24 |

CTFA, PEA and Medol-10 are monofunctional (meth) acrylate monomers. PEG600DA is a difunctional (meth) acrylate monomer. NVC is an N-vinyl amide monomer. BR113 in PEA is an acrylic resin solution in PEA (79% PEA, 20% Dianal BR113, 1% stabiliser, based on the total weight of the acrylic resin solution). U03092-14 is a passive resin blend (80% PEA, 20% DM55, based on the total weight of the resin blend). UV12 is a stabiliser. Tego 2010 is a slip aid. ITX, TPO and TPO-L are photoinitiators. OH TEMPO is a stray light inhibitor.

These inks do not include OHT and so are reference examples. We prepared these inks to determine the optimal concentration of optional preferred components.

The cyan pigment dispersion contains 30% pigment, 10% polymeric dispersing aid and 60% monomer. The dispersion was prepared by mixing the components in the given amounts and passing the mixture through a bead mill until the dispersion had a particle size of less than 0.3 microns. Amounts are given as weight percentages based on the total weight of the dispersion.

The viscosity of the ink was measured using a Brookfield viscometer running at 20 rpm at 25° C.

The inkjet inks of Table 9 were drawn down in a 24 μm film using a 24 μm wire wound K-bar onto the substrates detailed in Table 10. The ink films were then passed under a 20 W, 395 nm LED UV light (Phoseon Firepower FP300 150×20 mm) to provide a cured ink film.

The inks were assessed for surface tack and low temperature flexibility.

Low temperature flexibility was assessed by storing the prints in a freezer (set to −15° C.) for 24 hours. The draw-downs were then folded to a 1800 angle with the cured film on the outer surface.

The film & material was assessed on a 1-5 scale as detailed for Example 2. The results are provided in Table 10.

The surface tack was assessed as detailed for Example 2 and the results are also provided in Table 10.

TABLE 10

| Test | Substrate | Ink 18 | Ink 19 | Ink 20 | Ink 21 | Ink 22 | Ink 23 | Ink 24 | Ink 25 | Ink 26 | Ink 27 | Ink 28 |
|---|---|---|---|---|---|---|---|---|---|---|---|---|
| Low Temperature Flexibility (−15° C.) | 3P Textile (a) | 1.0 | 2.0 | 5.0 | 5.0 | 4.0 | 4.5 | 5.0 | 3.0 | 4.0 | 1.0 | 1.0 |
| | 3P Textile (b) | 5.0 | 5.0 | 5.0 | 5.0 | 3.0 | 4.0 | 5.0 | 5.0 | 5.0 | 2.0 | 5.0 |
| | Lintec PET | 4.5 | 4.5 | 4.5 | 5.0 | 5.0 | 5.0 | 5.0 | 5.0 | 4.5 | 4.5 | 4.5 |
| Tack test (>24 hours after curing) | 3P Textile (a) | 3.0 | 3.0 | 1.0 | 1.5 | 1.5 | 4.0 | 2.0 | 2.0 | 4.0 | 4.5 | 4.5 |
| | 3P Textile (b) | 3.0 | 3.0 | 1.0 | 1.0 | 1.5 | 4.0 | 2.0 | 1.0 | 4.0 | 4.5 | 4.5 |
| | Lintec PET | 1.0 | 2.0 | 1.0 | 1.0 | 1.0 | 3.0 | 2.0 | 1.0 | 3.0 | 4.5 | 4.5 |

For TPO-L, you can see from inks 18-20, that there is an increase in flexibility as you increase the amount of TPO-L. For surface tack, there is an initial improvement at 15% TPO-L but this reduces when the concentration of TPO-L increases to 20%.

The inclusion of TPO in varying amounts in combination with TPO-L in inks 21 and 22 improve flexibility (when compared to ink 18) but negatively affects the surface tack.

Regarding CTFA, on comparing ink 26 to ink 25, it can clearly be seen that on replacing CTFA with PEA, there is a slight decrease in flexibility and also a deterioration in surface tack.

Regarding Medol-10, on comparing inks 27 and 28, it is clear that ink 28 (which has Medol-10 present), has improved flexibility over ink 27 (which has PEA in place of Medol-10). They show the same surface tack results.

Inks 23 and 24 simply show BR113 that is an optional additional component.

What is claimed is:

1. An inkjet ink comprising: a radiation-curable material, wherein the radiation-curable material comprises polyethylene glycol (600) diacrylate; 4-hydroxy-2,2,6,6-tetramethylpiperidin-1-oxyl; and one or more photoinitiators selected from ethyl (2,4,6-trimethylbenzoyl) phenyl phosphinate, ethyl(3-benzoyl-2,4,6-trimethylbenzoyl)(phenyl) phosphinate, a polymeric phosphine oxide photoinitiator and mixtures thereof, wherein the polymeric phosphine oxide photoinitiator is

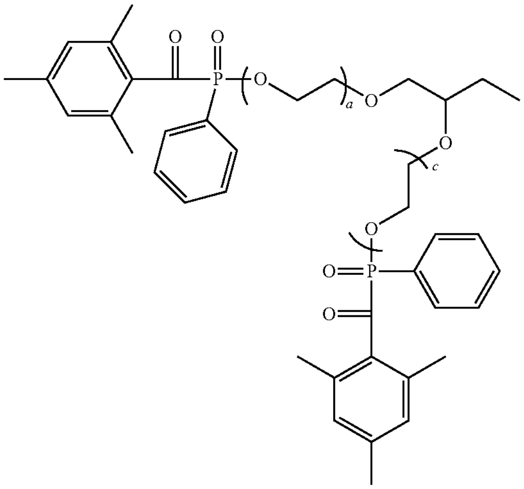

-continued

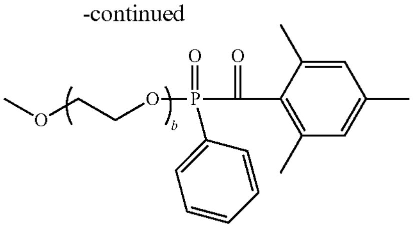

a + b + c = 1-20

2. The inkjet ink as claimed in claim 1, wherein the inkjet ink comprises ethyl (2,4,6-trimethylbenzoyl) phenyl phosphinate, based on the total weight of the ink.

3. The inkjet ink as claimed in claim 1, wherein the inkjet ink comprises ethyl(3-benzoyl-2,4,6-trimethylbenzoyl)(phenyl) phosphinate, based on the total weight of the ink.

4. The inkjet ink as claimed in claim 1 wherein the inkjet ink comprises a polymeric phosphine oxide photoinitiator, based on the total weight of the ink.

5. The inkjet ink as claimed in claim 1, wherein the ink comprises 0.01 to 2.5% by weight of 4-hydroxy-2,2,6,6-tetramethylpiperidin-1-oxyl, based on the total weight of the ink.

6. The inkjet ink as claimed in claim 1, wherein the radiation-curable material comprises a radiation-curable monomer present in 60.0 to 95.0% by weight, based on the total weight of the ink.

7. The inkjet ink as claimed in claim 1, wherein the radiation-curable material further comprises one or more of a monofunctional (meth)acrylate monomer and an N-vinyl amide monomer.

8. The inkjet ink as claimed in claim 1, wherein the radiation-curable material comprises N-vinyl caprolactam, based on the total weight of the ink.

9. The inkjet ink as claimed in claim 1, wherein the polyethylene glycol (600) diacrylate is present in 1.0 to 30.0% by weight, based on the total weight of the ink.

10. The inkjet ink as claimed in claim 1, wherein the radiation-curable material comprises (2-methyl-2-ethyl-1,3-dioxolane-4-yl)methyl acrylate and/or isopropylidene glycerol acrylate.

11. The inkjet ink as claimed in claim 1, wherein the radiation-curable material comprises cyclic TMP formal acrylate.

12. The inkjet ink as claimed in claim 1, wherein the radiation-curable material comprises: N-vinyl caprolactam; polyethylene glycol (600) diacrylate; cyclic TMP formal acrylate; and (2-methyl-2-ethyl-1,3-dioxolane-4-yl)methyl acrylate and/or isopropylidene glycerol acrylate.

13. A method of inkjet printing comprising inkjet printing the inkjet ink as claimed in claim 1 onto a substrate and curing the inkjet ink by exposing the inkjet ink to a curing source.

14. A substrate having the inkjet ink as claimed in claim 1 printed thereon.

* * * * *